Figure 1:
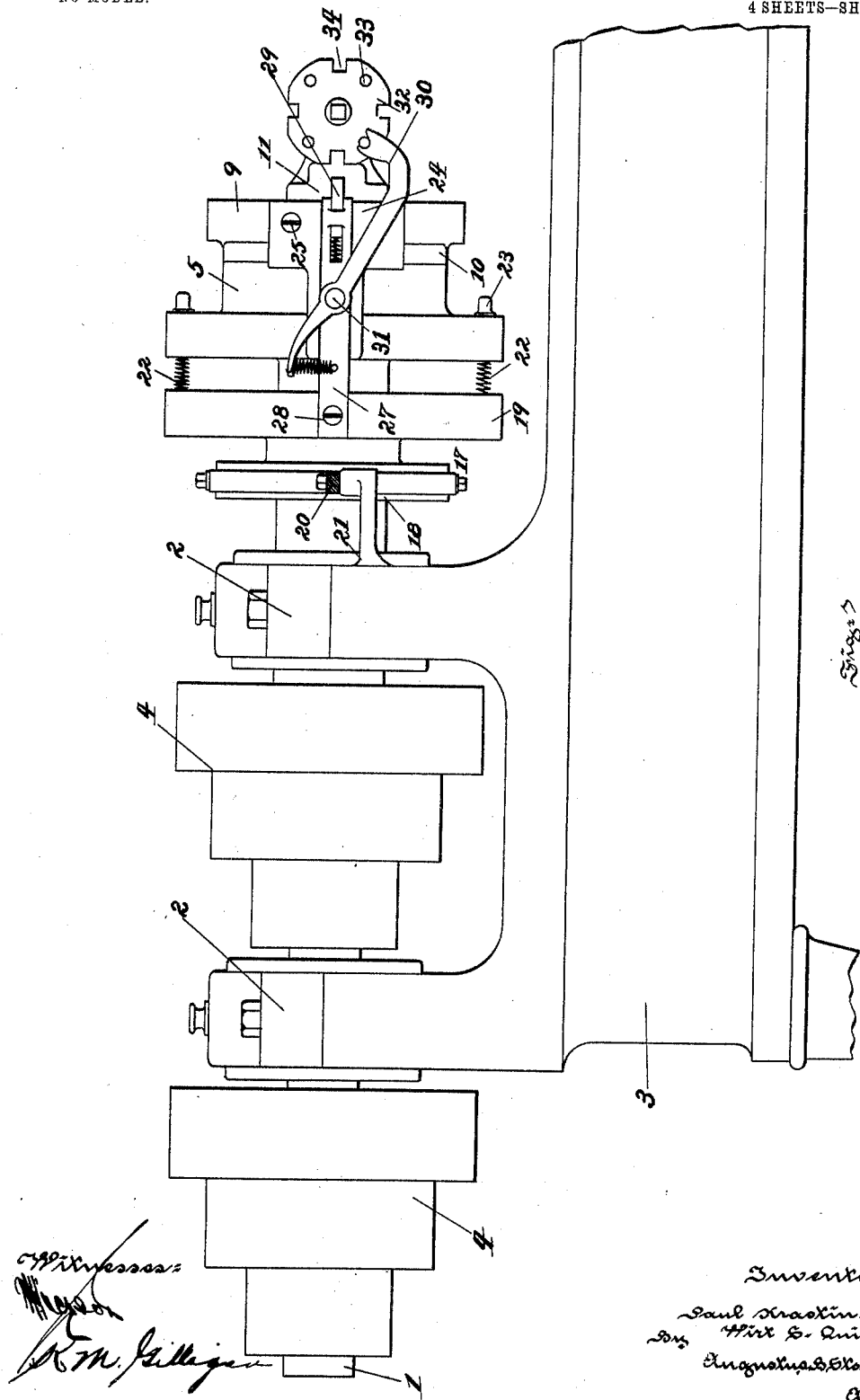

No. 777,111. PATENTED DEC. 13, 1904.
P. KRASTIN & W. S. QUIGLEY.
CHUCK FOR HOLDING ARTICLES TO BE DRESSED.
APPLICATION FILED MAY 29, 1902. RENEWED APR. 13, 1904.
NO MODEL. 4 SHEETS—SHEET 1.

No. 777,111. PATENTED DEC. 13, 1904.
P. KRASTIN & W. S. QUIGLEY.
CHUCK FOR HOLDING ARTICLES TO BE DRESSED.
APPLICATION FILED MAY 29, 1902. RENEWED APR. 13, 1904.
NO MODEL. 4 SHEETS—SHEET 2.
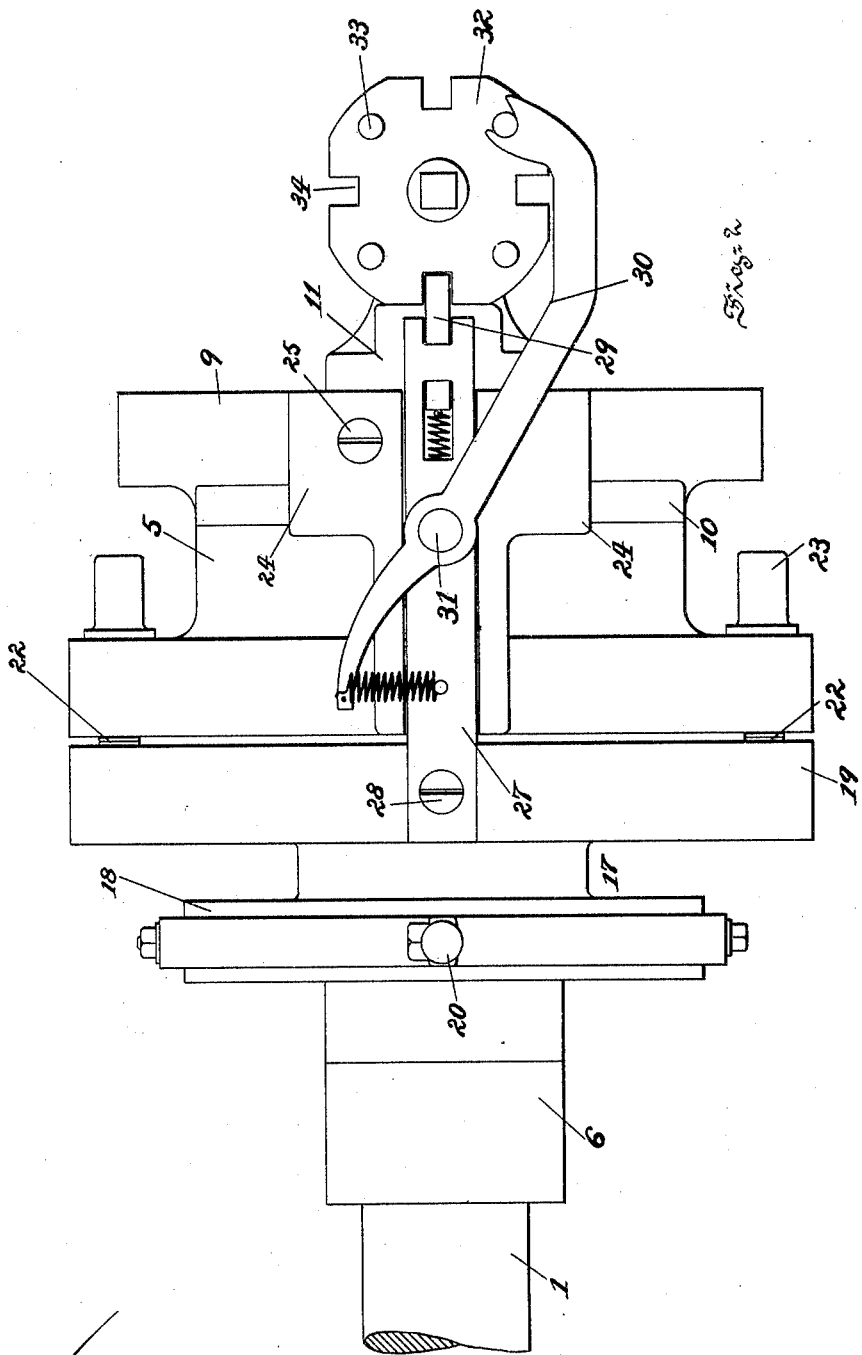

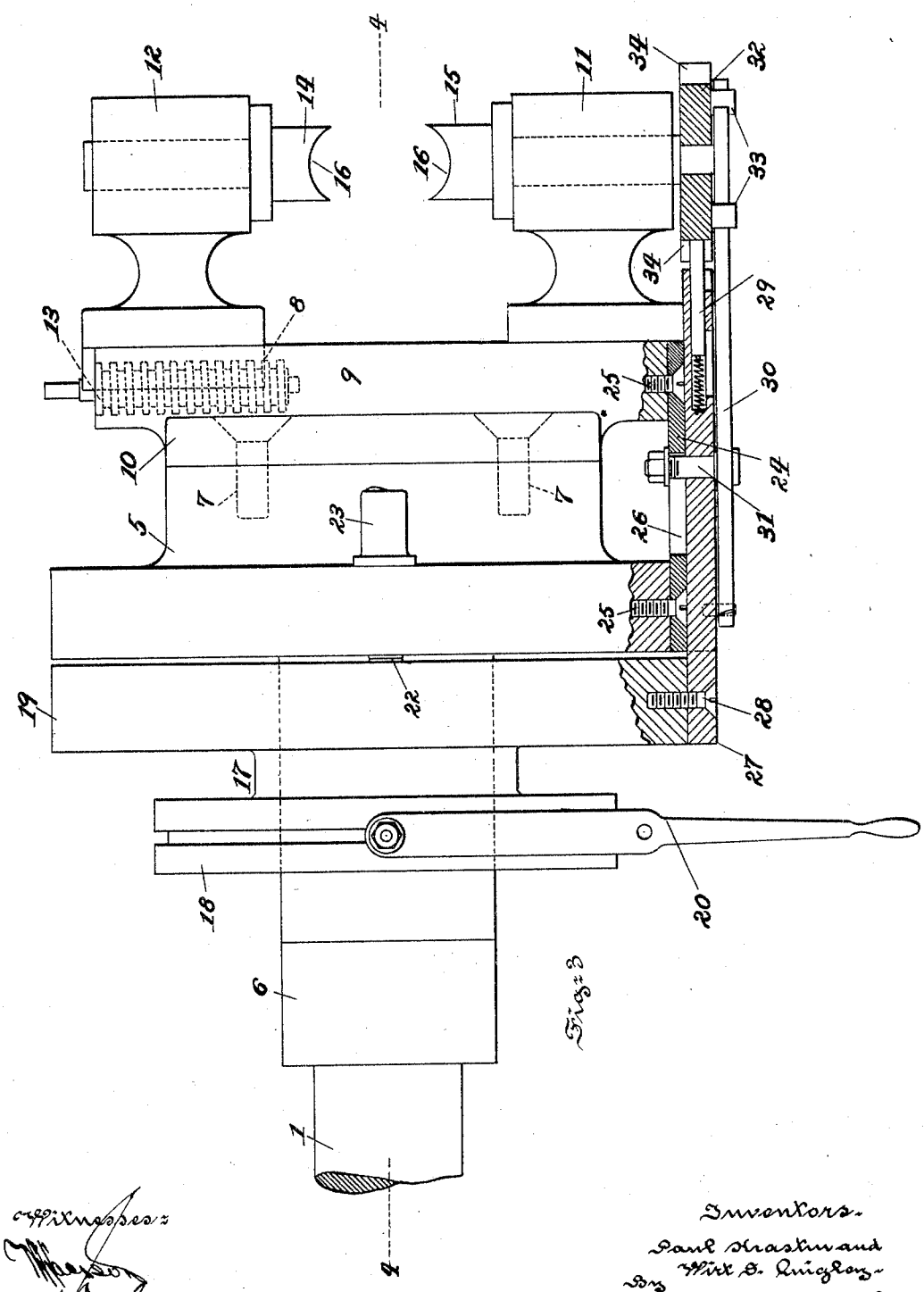

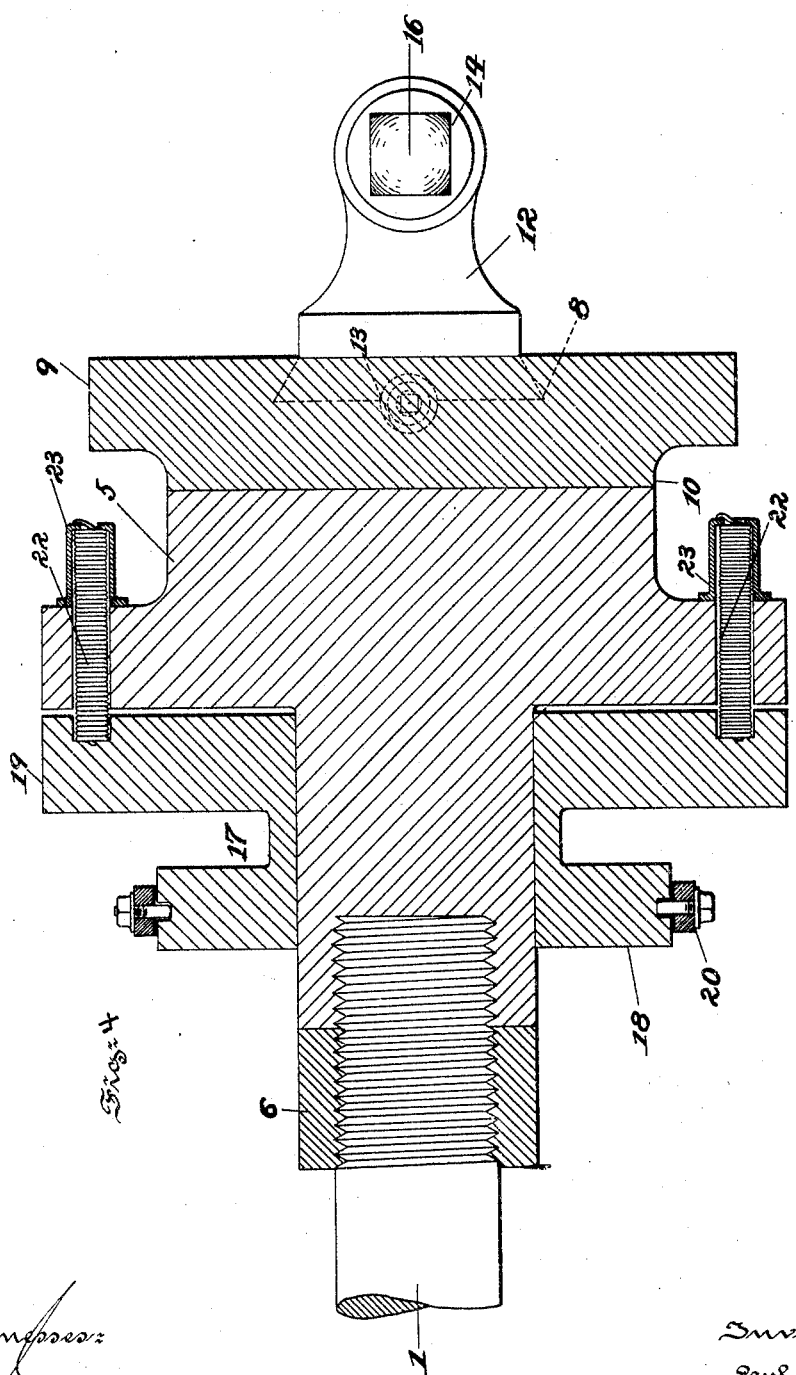

No. 777,111.

Patented December 13, 1904.

UNITED STATES PATENT OFFICE.

PAUL KRASTIN AND WIRT S. QUIGLEY, OF PHILADELPHIA, PENNSYLVANIA.

CHUCK FOR HOLDING ARTICLES TO BE DRESSED.

SPECIFICATION forming part of Letters Patent No. 777,111, dated December 13, 1904.

Application filed May 29, 1902. Renewed April 13, 1904. Serial No. 203,037. (No model.)

*To all whom it may concern:*

Be it known that we, PAUL KRASTIN and WIRT S. QUIGLEY, both citizens of the United States, residing at Philadelphia, in the county of Philadelphia and State of Pennsylvania, have jointly invented certain new and useful Improvements in Chucks for Holding Articles to be Dressed, of which the following is a specification.

One object of the present invention is to provide simple, efficient, reliable, and durable mechanism for turning articles held by chucks while the latter are in rotation; and to this and other ends hereinafter set forth the invention comprises the improvements to be presently described and finally claimed.

The nature, characteristic features, and scope of the invention will be more fully understood from the following description, taken in connection with the accompanying drawings, forming part hereof, and in which—

Figure 1 is an elevational view showing parts of a lathe and chuck fitted with mechanism embodying features of the invention. Fig. 2 is a view drawn to an enlarged scale and illustrating mechanism of the invention. Fig. 3 is a view partly in section and taken at right angles to the plane of the view shown in Fig. 2, and Fig. 4 is a sectional view taken on the line 4 4 of Fig. 3.

In the drawings, 1 is the chuck-spindle, revolubly mounted in bearings 2 of the lathe 3, and 4 represents cone-pulleys for driving them. The spindle 1 carries the chuck-head 5, which is shown as screwed onto it and held to place by a jam-nut 6. Arranged at the front or face of the chuck-head are crosswise-ranging ways 8. The latter may be formed in a face-piece 9, provided with a circular flange 10, through which the screws 7 pass. The face-piece 9 is provided with a fixed and immovable bearing 11 and with a similar bearing 12, which, however, is movable in the ways 8 by means of the screw 13, to the squared shank of which a wrench or other tool may be applied. Within the bearings are mounted removable and revoluble jaws 14 and 15, which hold the work to be dressed, which may consist of a gas-cock or the like. There is an advantage in having one of the bearings fixed and the other movable, and it may be described as follows: Jaws 14 and 15 with squared ends may be inserted in them with their ends in contact and the lathe set in motion and the tool caused to work upon these jaws so as to cut them out, as shown at 16, for the proper diameter of the article to be worked upon. In this way when the chuck is set to work upon such articles it becomes a matter of great ease and certainty to properly center them. In fact, they simply have to be inserted between the jaws and the upper jaw moved down so as to hold them.

Upon the spindle 1, or rather upon the shank of the chuck-head 5, there is mounted a movable collar 17. This collar 17 is movable endwise of the shank 1, but rotates with it and with the chuck-head. The collar consists of a grooved fork-disk 18 and of a flange 19 of substantially the same diameter as the adjacent portion of the chuck-head. There is a shipper-fork 20, which may be pivoted to a bracket 21, secured to one of the bearings 2, as shown in Fig. 1, and this shipper-fork coöperates with a groove in the fork-disk and affords means for shifting the latter. There are tension-springs 22 connected with the collar 17 and with the chuck-head 5. As shown, the latter is provided with boxes 23, which contain one of the ends of the springs and which are shown in Figs. 2 and 4.

24 represents ways secured to the chuck-head and chuck-face, as by screws 25, and these ways are provided with an oblong slot 26. Within these ways there is mounted so as to slide parallel with the shank 1 a traveler 27, secured to the collar, as by the screw 28, and fitted at its front end with a spring-actuated bolt 29, which projects beyond the end of the traveler for a purpose to be presently described. Pivotally connected with the traveler is the spring-actuated ratchet-arm 30. This ratchet-arm is mounted on a stud 31, which slides in the slot 26. Upon the shank of the jaw 15 is mounted a ratchet-wheel 32, shown as provided on one of its faces with pins 33, that are engaged by the ratchet-arm 30, and upon its periphery with radial openings or notches 34, which coöperate with the end of the spring-actuated bolt 29.

In use the object to be dressed is mounted between the jaws 16, and without stopping the rotation of the chuck it can be turned by simply moving the shipper-arm 20, the movement of which shifts the collar to which is attached the traveler against the force of the springs 22. In doing this the bolt 29 is drawn clear of the ratchet-wheel and the ratchet-arm is shifted so as to engage with another pin on the ratchet-wheel. Upon the release of the shipper-fork 20 the springs 22 shift the collar and traveler toward the right in the drawings, and in that way the ratchet-arm turns the ratchet-wheel 32, and the spring-bolt takes into an appropriate notch. Since it is a spring-bolt, it may abut upon the periphery of the ratchet-wheel, permitting the latter to be turned until a notch is just opposite to it, whereupon it slips into the notch and locks the ratchet-wheel. In this way some lagging or sliding movement out of time and of the parts can take place without interfering with the operation of the device.

It will be obvious to those skilled in the art to which the invention relates that modifications may be made in details without departing from the spirit thereof. Hence we do not limit ourselves to the precise construction and arrangement of parts hereinabove set forth, and illustrated in the accompanying drawings; but,

Having thus described the nature and objects of the invention, what we claim as new, and desire to secure by Letters Patent, is—

1. The combination with the chuck-head, of a revoluble jaw, a collar movable endwise of and rotatable with said head, means for shifting the collar, a traveler immovably connected with the collar and provided at its end with a spring-actuated bolt, a spring-actuated ratchet-arm mounted on the traveler, and a ratchet-wheel secured to the revoluble jaw and provided on its face with pins and on its periphery with notches, substantially as described.

2. Means for turning a chuck-jaw which comprise a ratchet-wheel provided on its face with pins and on its periphery with notches, and a movable traveler provided with a spring-actuated ratchet-arm operatively arranged in respect to the pins and at its end with a spring-actuated bolt operatively arranged in respect to the notches, substantially as described.

3. Means for turning a chuck-jaw which comprise a ratchet-wheel, and a movable traveler carrying a spring-actuated ratchet-arm and also carrying a spring-actuated bolt, substantially as described.

4. In combination, a chuck, ways secured to the periphery of the head of the chuck and arranged parallel with its axis of rotation, a collar movable endwise of and rotatable with the chuck, a traveler movable in said ways and secured to said collar, a spring-actuated bolt at the end of the traveler and a spring-actuated ratchet-arm secured to the traveler, a movable jaw, and a ratchet-wheel secured to said jaw and provided on its face with ratchet-pins and on its periphery with notches that coöperate with the spring-bolt, substantially as described.

5. Means for operating the revoluble jaw of a chuck while the latter is rotating which comprise ways provided with an oblong slot, a traveler movable in said ways, a spring-actuated ratchet-arm, a bolt to which the arm is pivoted and which works in said slot and engages said arm, a spring-actuated bolt on the end of said traveler, a ratchet-wheel provided with ratchet-pins and peripheral notches which coöperate with the spring-bolt, and a movable collar to which the traveler is rigidly connected, substantially as described.

In testimony whereof we have hereunto signed our names.
PAUL KRASTIN.
WIRT S. QUIGLEY.

Witnesses:
H. S. KIRKPATRICK,
WM. STEEL.